C. W. SALADEE.
Improvement in Springs for Vehicles.
No. 132,695.
Patented Oct. 29, 1872.
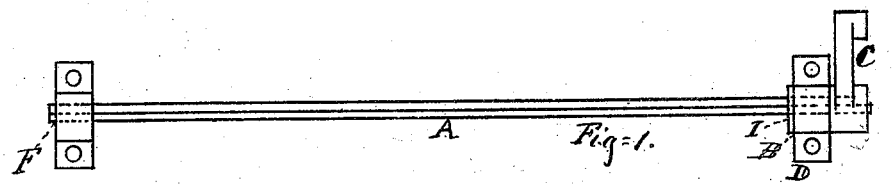
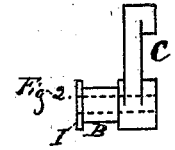
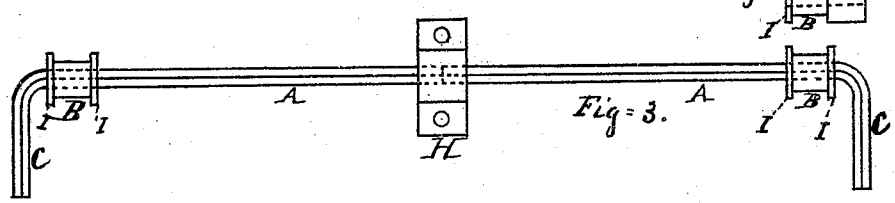
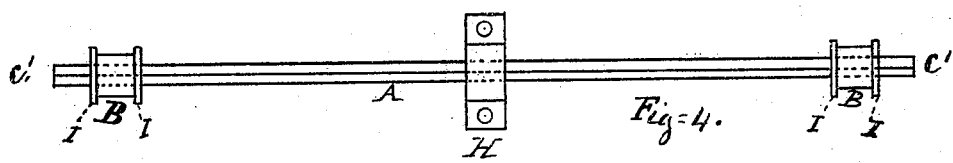
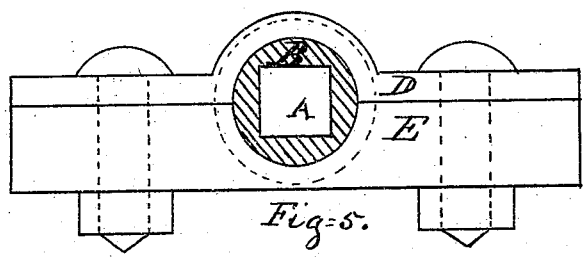

UNITED STATES PATENT OFFICE.

CYRUS W. SALADEE, OF ST. CATHARINES, CANADA.

IMPROVEMENT IN TORSION-SPRINGS FOR VEHICLES.

Specification forming part of Letters Patent No. 132,695, dated October 29, 1872.

*To all whom it may concern:*

Be it known that I, CYRUS W. SALADEE, late of St. Catharines, Dominion of Canada, have invented certain new Improvements in Torsion-Springs, of which the following is a specification embodying my invention.

Nature and Object.

The nature of my present invention consists in the employment of squared rods or bars of steel for torsional springs, and in the peculiar application of the same, as hereinafter more fully shown and described; and has for its object, first, greater strength to a given size of steel as compared with round rods; and, second, to simplify and cheapen the preparation of torsional rods ready for application.

Squared rods of steel have never been used for torsional springs, for the obvious reason that they must needs be turned down to a round bearing at the end where the lateral lever-arms turn off to admit of torsional action in the bearings at that point; and hence, if the torsional strength of the square of the steel is calculated and relied upon, it would be found too weak at the point of the round bearing, and would then be strained out of its normal position or broken; but if the squared rod could be so applied as to maintain the squared sides throughout its entire length rods of this form would, in all cases, be preferable to round ones in every respect, greater strength would be secured, and the cost of manufacture greatly reduced; and the attainment of this object is the chief point of my invention.

The Drawing.

Figure 1 is a top view of the first modification of the squared spring; Fig. 2 is a side elevation of the crank seen in Fig. 1, showing the sleeve B made a part of the crank; Fig. 3 is a top view of the second modification; Fig. 4 is a top view of the third modification; and Fig. 5 is a side elevation of the "split box," in which the loose sleeve B finds its bearing, it being an enlarged view of these parts.

To obviate the objection above referred to of turning the required round bearing at or near the lever ends of the square rod, I provide a flanged sleeve, B, or its equivalent, of the requisite diameter to admit of passing the square rod A through its center, and this sleeve B finds its bearing in the split box D E, Figs. 1 and 5; so also the opposite end of the rod, in Fig. 1, passes through the fixed bearing-plate F, where it is rigidly held in position at that point while the flanged sleeve B is permitted free action in its bearing. It will thus be seen that positively no preparation or alteration of the uniform square of the rod in Fig. 1—other than to cut it off the required length and temper it—is required; but, on the contrary, when cut off the proper length it is ready for application. In Fig. 1 the sleeve B is cast or formed solid with the crank C; but, if preferred, it is made separate from and independent of the crank, as in Figs. 3 and 4, and the lever arm or crank may either be formed out of the ends of the rod, as in Fig. 3, or a crank may be fitted to the square ends C', Fig. 4, after passing through the sleeve B. Fig. 5 shows the sleeve B in section with the outer flange I removed, while the inside flange is represented by the circular dotted line in position in its bearing, with a square hole pierced through its center to receive the full size of the square rod A. In the first modification, Fig. 1, the rod extends its full length across to the bearing-plate F, and where it is rigidly held, as before described. This gives greater torsional action than in the remaining two other modifications by reason of its great length. In the second modification, Fig. 3, the outer ends of the rods A and A are bent at right angles with the main body to form the lever-arms C and C, while their inner ends find a rigid bearing in the bearing-plate H, and butt together in the center of this bearing, as indicated by the dotted lines at this point. The separation of the rod at its center, in the bearing H, is necessitated from the fact that otherwise (by reason of the bent arms C') they could not be passed through the loose sleeve B. In the third modification, Fig. 4, the squared rod A is left whole, same as in Fig. 1, but is rigidly held by its center in the bearing-plate H, and the cranks are then fitted on the outer ends C', as before described.

I will here state that it is my purpose to employ squared torsional springs on the plan of my invention in wheeled vehicles of every class and kind, and for such other purposes where the same is applicable and desirable.

*Claims.*

I claim as my invention—

1. A torsional spring composed of square rods of steel, as and for the purpose set forth.

2. The loose sleeve-bearing B, for supporting and operating squared torsional springs, substantially as and for the purpose set forth.

3. The crank C having a sleeve-bearing, B, rigidly secured upon the inner end, or formed thereupon as a part of the crank, in combination with the squared torsional spring, as and for the purpose set forth.

CYRUS W. SALADEE.

Witnesses:
C. W. SALADEE, Jr.,
G. B. SALADEE.